Patented July 29, 1952

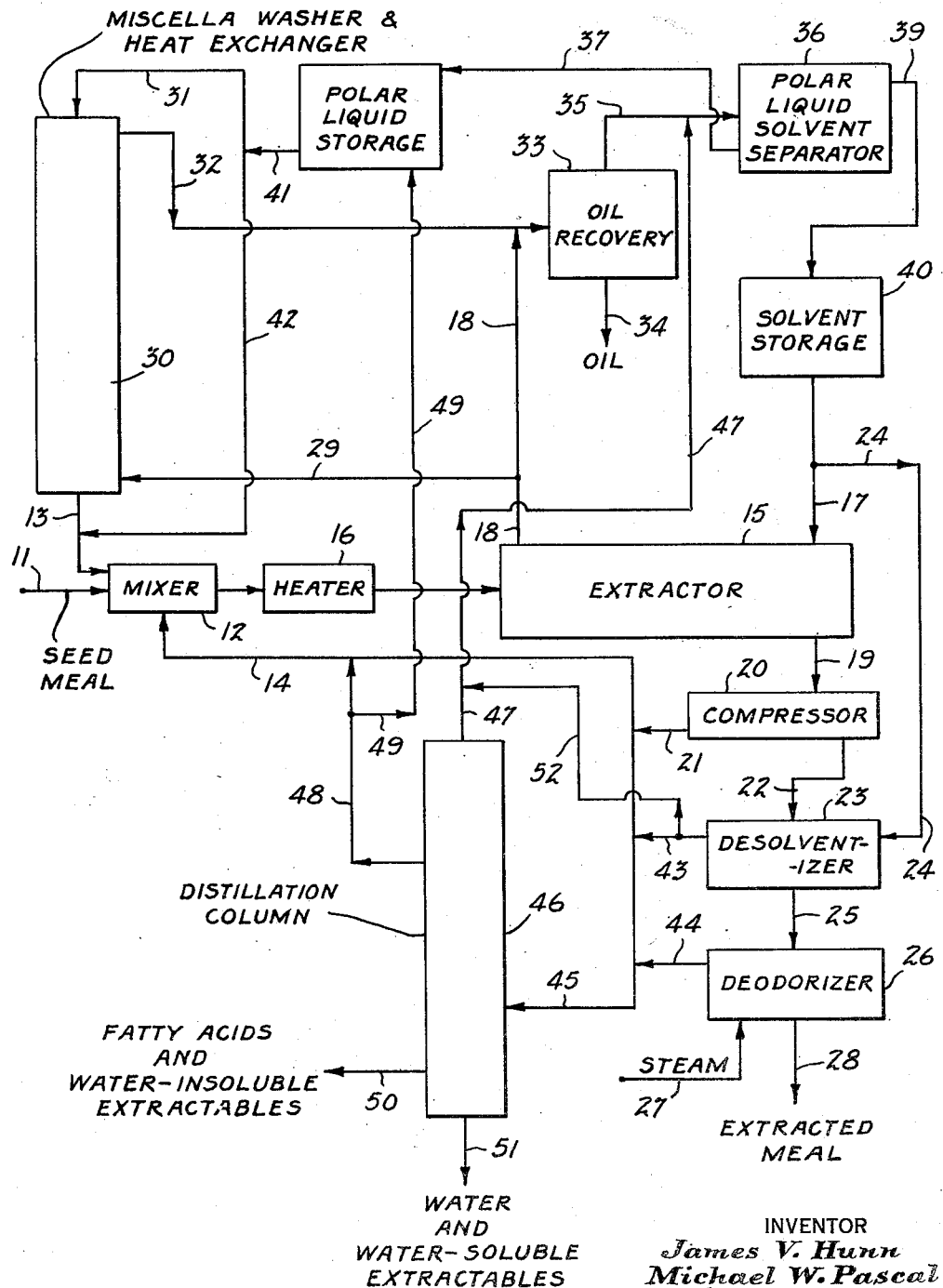

2,605,271

UNITED STATES PATENT OFFICE 2,605,271

SOLVENT EXTRACTION OF OIL

James V. Hunn, Avon Lake, and Michael W. Pascal, Shaker Heights, Ohio, assignors to The Sherwin-Williams Company, Cleveland, Ohio, a corporation of Ohio Application April 22, 1949, Serial No. 88,952

16 Claims. (Cl. 260—412.4)

The present invention relates to a process for the solvent extraction of vegetable oils from oil-containing seeds, beans, nuts and the like and more particularly to a process for obtaining very high yields of vegetable oils from their natural sources, said oils being substantially entirely free of solid particles. The present invention also relates to a process for extracting oil from seeds, beans and nuts having a high oil content without the need for forepressing or special preparation.

For the purpose of this description, the term "seeds" will be used throughout to denote not only seeds, but also beans, nuts, and other natural sources of vegetable oils such as cotton seed, castor beans, soya beans, peanuts, flaxseed, hemp seed, sunflower seed, oiticica, tungnut, coconut and the like. The solid particles which frequently accompany an extracted oil include those of colloidal size as well as those of slightly larger size which are derived from the cellular, cortical and/or proteinaceous constituents of the seeds, and these particles will hereinafter be termed "fines."

Vegetable oils are generally recovered from their natural source by expression of the oil in expellers or other mechanical pressing devices such as the cage press or are recovered by treatment of crushed seeds with a solvent for the oil. Occasionally combinations of these two methods have been used with advantage.

In the case of seeds containing a high oil content, such as flaxseed, it has been necessary to forepress the seeds to remove about half of the available oil before solvent extraction in order to compress or harden the meal so that an excessive amount of fines are not produced. Such fines are extremely difficult to remove from the miscella. If in the forepressing operation too great a density of the meal is obtained, solvent extraction becomes difficult and incomplete.

For solvent extraction of other seeds, such as soya beans, they must be conditioned and flaked on flaking rolls in order to extract the oil while obtaining a minimum amount of fines.

In all prior processes the prepared meal must be carefully handled to avoid comminuting the solid meal particles with consequent increase in the amount of fines.

A method for clarifying vegetable oils to remove the fines is described in our copending application Serial No. 64,142 filed December 8, 1948.

According to the present invention, an improved method for the solvent extraction of vegetable oils from seeds has been devised in which a combination of two substantially immiscible liquids are used. In general, the process involves the use of a non-polar solvent for the vegetable oil, and a polar liquid which preferentially wets the solid material and fines and is substantially immiscible with said oil solvent so that the extracted oil will be substantially entirely free of fines and other solid particles.

The phenomenon on which the present invention is based is that the fines and other solid particles contained in a seed meal are hydrophilic and are more easily wetted by polar liquids or aqueous polar solutions than by the solvents which are normally used for the extraction of oil from seed meals. When the seed meal is mixed with the polar liquid, the solids therein are preferentially wetted by this liquid, thus minimizing the tendency of the solid particles to be wetted by the solvent for the oil when the seed meal is contacted with the solvent in the extractor. The oil contained in the seed meal, however, is substantially insoluble in the polar liquid but is readily dissolved by the solvent therefor. Thus the solvent preferentially dissolves the oil while the solid particles are preferentially wetted by the polar liquid. Since the polar liquid and solvent are substantially immiscible, a clean separation is obtained with maximum extraction of the oil from the seed meal.

It is, therefore, an object of the present invention to provide a process for obtaining clear, brilliant vegetable oils. Another object of the present invention is to provide a unitary process by which vegetable oil may be substantially completely recovered from its natural source. A still further object of the present invention is the provision of a continuous process for extracting oil from oil-containing vegetable materials. Additional advantages will become apparent from the following description of the invention.

In general any highly polar volatile liquid which has limited solubility in non-polar solvents, such as aliphatic hydrocarbons and vegetable oils, or which can be made essentially insoluble in these constituents by the addition of limited quantities of water, are usable in this invention.

The amount of water that may be used with the polar liquid is limited only by the solubility of water in that particular liquid and the solubility of the water-soluble constituents of the seed meal in the polar liquid-water mixture. For example, certain seeds such as flaxseed contain mucilagenous constituents such as mucin which will dissolve in the polar liquid when the water content thereof exceeds certain values, thus forming a thick, unmanageable mass. In the case of the lower alcohols, the water should not exceed about 60%. These limits are different, of course, for each polar liquid.

Polar liquids which have been found to be useful in the present method are low molecular weight aliphatic monohydric alcohols having not more than 4 carbon atoms, such as methyl, ethyl, propyl and isopropyl alcohol; water and alcohol solutions; aldehydes, such as furfural; organic acids; ethers; ketones, such as acetone and methyl ethyl ketone; and the like.

In the case of the alcohols, which are preferred, it has been found that ethyl alcohol, propyl alcohol or isopropyl alcohol can be used satisfactorily. Methyl alcohol can also be used, but, due to its greater volatility and toxicity, it presents practical difficulties which render it less satisfactory than ethyl alcohol. Alcohols having a higher molecular weight than the propyl alcohols, such as butyl alcohol, may be used but are generally not suitable in the present process since they are not sufficiently volatile for easy removal from the extracted meal.

It has been found that aqueous solutions of ethyl alcohol and isopropyl alcohol are particularly suitable for use in the present process. However, when it is desired not to extract the fatty acids from the oil, it is generally necessary to limit the concentration of the alcohol in water solution since the fatty acids are soluble in the more concentrated aqueous alcohol solutions. In the case of aqueous solutions of ethyl alcohol, isopropyl alcohol and the like, the concentration should not be greater than about 80% alcohol.

The oil solvent may be a saturated aliphatic hydrocarbon having from about 3 to about 9 carbon atoms and preferably 6 or 7 carbon atoms such as hexane, cyclohexane, heptane or their isomers. Commercial solvent containing substantial quantities of these materials may be used. The lighter hydrocarbons such as propane, butane and pentane and their isomers may be used but in this case it is generally necessary to operate the system under pressure so as to maintain the solvent in a liquid phase. Heavier hydrocarbons can be used such as octane, but they require excessive temperatures for vaporization and azeotropic distillation as described hereinafter. Generally speaking the non-polar solvent must be substantially immiscible with the polar liquid and must be liquid under the conditions of operation which must, in turn, be such as not to affect the properties of the vegetable oil being extracted.

In order to more clearly describe the invention, reference will be made to the accompanying drawing which is a diagrammatic flow sheet of the process.

Referring now to the drawing, oil-bearing seeds are first comminuted to relatively small particle size, thus forming a meal. The meal is introduced through line 11 to a mixer 12 in which the meal is thoroughly mixed with polar liquid introduced through line 13 and line 14. The polar liquid, for convenience, will be referred to hereinafter as "alcohol."

The alcohol-meal mixture is then passed to the extractor 15. The extractor may be of any conventional type and may conveniently include a screw conveyor along the bottom thereof for moving the meal from the inlet end to the outlet end. The extractor is provided with a temperature gradient such that the meal outlet end is relatively cool, for example between about 70° F. and about 90° F., while the meal inlet end is maintained at a higher temperature, for example between about 120° F. and about 160° F. The meal and alcohol mixture may be raised to the desired temperature by employing hot alcohol from line 13 as hereinafter described or by applying heat to the mixer 12. Alternatively the meal and alcohol mixture may be heated in a heater 16.

The non-polar solvent or oil solvent, which is introduced into the extractor through line 17 is relatively cool and the temperature thereof is gradually increased as it passes through the extractor 15 to outlet line 18. Conversely, the alcohol and meal are gradually cooled as they pass through the extractor 15 to outlet 19.

As the meal is progressively moved through the extractor, it is thoroughly mixed with the oil solvent in the central zone thereof, whereby the solvent extracts the vegetable oil from the seed meal to form an oil-solvent solution or miscella. The miscella is withdrawn from the extractor through line 18 for further treatment as described below.

The oil-free meal and the alcohol are withdrawn from the extractor 15 and passed to a compressor 20 in which the meal is compacted to express as much of the alcohol as possible. The expressed alcohol is withdrawn through line 21 and the meal is passed from the compressor 20 through line 22 to a desolventizer 23. Although the mixer 12, heater 16, extractor 15 and compressor 20 have been described as separate pieces of apparatus, it will be understood that a single piece of apparatus adapted to carry out these functions can be used.

The recovered alcohol, if substantially free of fatty acids or other alcohol extractable materials contained in the oil, may be passed from line 21 to line 14 and to the mixer 12 for admixture with fresh meal. The extracted meal which still contains substantial quantities of alcohol is treated in the desolventizer 23 for removal of substantially all of the remaining alcohol. For purposes to be described later, some of the non-polar solvent can be introduced into the desolventizer 23 through line 24. The desolventized meal is then passed through line 25 to a deodorizer 26 for the removal of traces of alcohol and/or solvent from the meal. To assist the deodorization, steam or other suitable material may be admitted through line 27 to the deodorizer 26. The extracted meal is then withdrawn from the system through line 28.

The miscella which is withdrawn through line 18 from the extractor 15 is normally passed through line 29 into the bottom of a miscella washer, or scrubber 30 and passes upwardly therethrough while alcohol which is introduced through line 31 into the top of the scrubber 30 passes downwardly therethrough, thereby removing from the miscella any fines or other solid particles which may have been carried therewith from the extractor. This particular step of the present process is described more fully in our above-mentioned application Serial No. 64,142. An additional function of the scrubber 30 is to preheat the alcohol which is then withdrawn from the bottom of scrubber 30 through line 13 for introduction into the mixer 12. The miscella is then withdrawn from the top of the scrubber 30 through line 32 and is passed to an oil recovery system 33 in which the solvent, such as hexane or heptane, is removed from the oil, for example by distillation. The recovered oil is then withdrawn from the system through line 34. The recovered solvent will contain a small amount of dissolved alcohol which has been picked up in the extractor 15 and/or scrubber 30. This is due to the fact that alcohol is slightly more soluble in the miscella than in the oil-free solvent, the oil acting in the nature of a mutual solvent for the non-polar solvent and alcohol. The recovered solvent is passed through line 35 to an alcohol-solvent separator 36. To obtain as high a degree of separation as possible, it may be desirable to cool the recovered solvent when introducing it into separator 36. The substantially solvent-free alcohol is passed through line 37 to a storage tank 38 and the substantially alcohol-free solvent is passed through line 39 to storage tank 40.

When extracting oil from certain seeds or beans in which little or no fines are found, it may be desirable to pass the miscella directly from extractor 15 through line 18 to line 32 and the oil recovery system 33, thus by-passing the scrubber 30. In this event it will likewise be desirable to pass the alcohol from storage tank 30 through lines 41 and 42 to line 13, thus by-passing the scrubber 30.

The vapors recovered from desolventizer 23 and deodorizer 26 are withdrawn, respectively, through lines 43 and 44. If these vapors contain no substantial amounts of the solvent, they may be passed directly to line 14 together with the alcohol from line 21 but since solvent may be present as described below, they are preferably passed through line 45 to a distillation column 46.

When the vegetable material being treated contains substantial amounts of fatty acids and/or unsaponifiable materials, they will be largely dissolved in the alcohol which is expressed from the extracted meal in compressor 20. If this alcohol were continuously recycled directly to the mixer 12 through line 14 there would be a build-up in the system of the fatty acids and unsaponifiable materials. This would be highly undesirable since the fatty acids act as a mutual solvent for the alcohol and solvent, thereby tending to prevent the desired phase separation in the extractor 15. It is, therefore, proposed to intermittently or preferably continuously pass the alcohol in line 21 to line 45 and thence into the distillation column 46 in order to remove these alcohol-soluble materials from the system.

The distillation column 46 or any other suitable equipment is operated with a temperature gradient so as to effect a separation between an alcohol-solvent azeotrope and alcohol. The temperature at the top of the column is regulated in accordance with the boiling point of the azeotrope. The azeotropic vapors are passed through lines 47 and 35 to separator 36 for phase separation together with the recovered solvent from oil recovery system 33. At a lower point in the still where a higher temperature is maintained, there is provided a draw-off for excess alcohol. The alcohol so withdrawn may be passed while hot through line 48 to line 14 and thence directly to the mixer 12 or it may be returned to the alcohol storage tank 38 through line 49. The inlet line 45 enters the column 46 near the bottom thereof as shown in the drawing. The still bottoms which include water from the moisture content of the seeds or from the steam introduced into the deodorizer 26, fatty acids and extractable materials can be withdrawn and subsequently allowed to settle or can be allowed to stratify in the bottom of the still and be withdrawn through lines 50 and 51, respectively. The lower layer comprises water and those materials which are water and alcohol-soluble while the upper layer comprises fatty acids and those materials which are alcohol-soluble but water-insoluble.

In general the main cycle for the solvent is from tank 40, through line 17 to the extractor 15 where it extracts the oil from the seed meal to form the miscella. The miscella is then passed through lines 18 and 29 to scrubber 30 where any fines which may have been carried along therewith are removed. The miscella then passes through line 32 to an oil recovery system 33 from which the oil is withdrawn through line 34 and the solvent, together with small amounts of alcohol, are passed through line 35 to the separator 36. From the separator 36 the solvent is returned to storage tank 40 through line 39.

The alcohol cycle is from storage tank 38 through lines 41 and 31 to the scrubber 30 where it picks up any fines contained in the miscella and is preheated before being passed through line 13 to the mixer 12. The alcohol then passes through the optional heater 16, the extractor 15 to the compressor 20. Most of the alcohol is removed from the extracted meal in compressor 20 and is normally passed through lines 21 and 45 to the distillation column 46. A portion of the alcohol may be returned directly to the mixer 12 through lines 48 and 14 while the remaining portion of the alcohol in the form of the alcohol-solvent azeotrope, passes through lines 47 and 35 to the separator 36. The alcohol is withdrawn therefrom through line 37 and is returned to the alcohol storage tank 38.

It will, of course, be understood that the lower aliphatic alcohols are slightly soluble in the hydrocarbon solvent and that the hydrocarbon solvent is slightly soluble in the alcohols; the degree of solubility in each case decreasing with temperature and water content.

One of the important features of the present invention is the utilization of the phenomenon that the hydrocarbon solvents and the aliphatic alcohols which may be used in the present process will form azeotropic mixtures. Due to this phenomenon, it is possible to desolventize the extracted meal to a much greater degree than is possible by merely attempting to evaporate the liquid from the wetted extracted meal. The alcohol-wet meal which is passed from the compressor 20 to the desolventizer 23 cannot be properly desolventized by the sole use of heat since the temperatures necessary to evaporate substantially all of the alcohol would adversely affect the proteinaceous material contained in the extracted meal. However, by adding a regulated quantity of the hydrocarbon solvent through line 24 to the desolventizer 23, it is possible to evaporate an azeotrope of the hydrocarbon solvent and the alcohol at a lower temperature, thus preventing degradation and other adverse effects on the proteins. When the vapors in line 43 substantially entirely comprise the desired azeotrope, they may be passed from line 43 through line 52 directly to line 47. However, if substantial quantities of excess alcohol or solvent are present in these vapors, they are preferably passed to the column 46 through line 45.

The quantity of non-polar solvent introduced through line 17 is controlled so that the specific gravity of the miscella will be less than the specific gravity of the polar liquid. This ensures a clean separation of the miscella and the polar liquid in the extractor 15 and also assists in the operation of the scrubber 30. Normally an increase in the proportion of oil in the miscella, increases the specific gravity thereof. Therefore, the proportion of oil in the miscella must not exceed that which will result in a specific gravity greater than the specific gravity of the particular polar liquid being used. For example, when an 85% ethyl alcohol solution is used in the extraction of linseed from flaxseed with heptane, the miscella should not have an oil concentration greater than 40%.

The proportion of non-polar solvent to polar liquid is not critical and may vary from just sufficient polar liquid to thoroughly wet the meal to much greater quantities that may be in excess of non-polar solvent.

We have found that for efficient operation, sufficient polar solvent should be used to form a flowable slurry with the meal. When these conditions exist, efficient separation of the two phases readily takes place.

When aqueous solutions of polar wetting agents are used, the concentration of the wetting agent in the solution must be controlled to satisfy, as nearly as possible, two factors. The first and more important factor relates to the solvent power of the polar liquid for the solvent or miscella, whereas the second factor relates to the interfacial tension of the polar liquid.

To meet the first-mentioned factor, the polar liquid should be diluted with sufficient water to decrease the solubility of the polar liquid in the miscella to an insignificant value while the second-mentioned factor calls for dilution with a minimum quantity of water so as to obtain as low an interfacial tension as possible while at the same time complying with the first factor. For example, if a highly concentrated aqueous solution of an alcohol and heptane were used, the oil acts in the nature of a mutual solvent for the heptane and the alcohol so that the alcohol solution might contain appreciable quantities of the heptane and oil. Occasionally it is necessary to add relatively large quantities of water to the polar liquid in order to reduce the solvent power of the aqueous polar liquid solution for oil to a negligible value, thus raising the interfacial tension to a value which is higher than would be normally desired. Such solutions may nevertheless be used in the present invention provided the seed meal and polar solution are mixed with sufficient agitation and for such a period of time as to ensure wetting of all of the fines and solids in the meal.

Although the present invention has been described with particular reference to the accompanying flow sheet, it will be understood that the present invention may be carried out in various different ways without departing from the spirit of the invention. Also, it will be understood that wherever a specific type of apparatus has been described, other types of apparatus may be used for performing the same or similar functions. For simplicity sake representations of conventional pieces of apparatus, such as valves, pumps, heat exchangers and the like, have not been included in the drawings since these will be readily understood by those skilled in the art.

This application is a continuation-in-part of our copending application Serial Number 64,142 filed December 8, 1948 and entitled "Clarification of Liquids."

What is claimed is:

1. A method of extracting oil from oil bearing seeds comprising contacting a meal of crushed oil bearing seeds with an aqueous solution of a hydrophilic organic solvent for oil in such amount as to form a flowable slurry with the meal, passing said slurry through an extraction zone, passing an aliphatic organic solvent for the oil through said zone counter-currently to the direction of said slurry and in admixture therewith, said aqueous solution containing sufficient water to render said solution substantially immiscible with the aliphatic solvent and insufficient water to cause complete insolubility of the oil in the aqueous solution, agitating the mixture in said extraction zone whereby the oil in said meal is taken up by said aliphatic solvent to form a miscella while said substantially oil free meal remains in said slurry with said aqueous solution, progressively separating the mixture into two phases, one being the miscella and the other the substantially oil-free slurry, and separately withdrawing the miscella and said substantially oil-free slurry from said extraction zone.

2. A method as claimed in claim 1 and further comprising recovering said aqueous solution from said substantially oil-free slurry, washing said miscella with at least a portion of said recovered aqueous solution to remove any residual meal therefrom and recovering said aliphatic solvent from said washed miscella.

3. A method of extracting oil as claimed in claim 1 and further comprising recovering said aliphatic solvent from said miscella adding at least a portion of said recovered aliphatic solvent to said substantially oil-free slurry to form a mixture therewith, heating said mixture to evaporate said aliphatic solvent and said aqueous solution as an azeotropic mixture from said meal and separating the aliphatic solvent from the aqueous solution in the azeotropic mixture.

4. A method of extracting oil from oil bearing seeds comprising mixing a meal of crushed oil bearing seeds with an aqueous solution of hydrophilic organic solvent for oil in such amount as to form a flowable slurry with the meal, mixing said slurry with an aliphatic hydrocarbon solvent for oil in an extraction zone, said aqueous solution containing sufficient water to render said solution substantially immiscible with the aliphatic hydrocarbon solvent but insufficient water to cause complete insolubility of the oil in the aqueous solution agitating said mixture in said extraction zone whereby the oil in said meal is taken up by said aliphatic solvent to form a miscella while said substantially oil free meal remains in said slurry with said aqueous solution, progressively separating the mixture into two phases, one being the miscella and the other a slurry of substantially oil free meal and the aqueous solution, and separately withdrawing said phases from said extraction zone.

5. A method of extracting oil from oil bearing seeds comprising mixing, in an extraction zone, a meal of crushed oil bearing seeds with a sufficient amount of an aqueous solution of a hydrophilic organic solvent for oil to form a flowable slurry and with an aliphatic hydrocarbon solvent for oil, for extraction of the oil from said meal, said aqueous solution containing sufficient water to render said solution substantially immiscible with the aliphatic hydrocarbon solvent but insufficient water to cause complete insolubility of the oil in the aqueous solution, agitating the mixture in said extraction zone, progressively separating one phase comprising a relatively clear miscella from a second phase comprising substantially the aqueous solution and the oil-free meal and separately withdrawing said phases from said extraction zone.

6. A method of extracting oil as claimed in claim 5 wherein the hydrophillic organic solvent for oil is selected from the group consisting of low molecular weight aliphatic monohydric alcohols, aldehydes, organic acids, ethers and ketones.

7. A method as claimed in claim 5 wherein the aqueous solution recovered from said extracted meal is treated for the removal of those materials originally contained in the meal which are soluble in said aqueous solution.

8. A method as claimed in claim 5 wherein the hydrophilic solvent comprises an alcohol.

9. A method as claimed in claim 8 wherein the concentration of the alcohol in the aqueous solution is not greater than about 80%.

10. A method as claimed in claim 9 wherein the concentration of the alcohol in the aqueous solution is from about 40% to about 80%.

11. A method as claimed in claim 8 wherein the alcohol is a low molecular weight aliphatic alcohol.

12. A method as claimed in claim 11 wherein the alcohol is isopropyl alcohol.

13. A method as claimed in claim 11 wherein the alcohol is ethyl alcohol.

14. A method as claimed in claim 5 wherein the hydrocarbon solvent has a low molecular weight.

15. A method as claimed in claim 14 wherein the hydrocarbon solvent is a heptane.

16. A method as claimed in claim 14 wherein the hydrocarbon solvent is a hexane.

JAMES V. HUNN.
MICHAEL W. PASCAL.

REFERENCES CITED

The following references are of record in the file of this patent:

UNITED STATES PATENTS

| Number | Name | Date |
|---|---|---|
| 1,917,734 | Rewald | July 11, 1933 |
| 2,200,390 | Freeman | May 14, 1940 |
| 2,228,040 | Voogt | Jan. 7, 1941 |
| 2,384,388 | Monte et al. | Sept. 4, 1945 |
| 2,480,221 | Caplan | Aug. 30, 1949 |
| 2,484,831 | Hutchins et al. | Oct. 18, 1949 |
| 2,489,599 | Trottmann | Nov. 29, 1949 |

OTHER REFERENCES

Meyer, "High Polymers," vol. IV, page 576.
Ind. & Eng. Chem. 38, 1946, page 642.